United States Patent [19]

Frossard et al.

[11] 4,041,541
[45] Aug. 9, 1977

[54] SUPERVISORY AND CONTROL SYSTEM FOR ROTARY MACHINERY, PARTICULARLY ROTARY ELECTRICAL MACHINES

[75] Inventors: Emile Frossard, Wettingen; Fritz Schleuniger, Wurenlos; Bruno Stadler, Untersiggenthal, all of Switzerland

[73] Assignee: Brown, Boveri & Cie., Baden, Switzerland

[21] Appl. No.: 645,889

[22] Filed: Dec. 31, 1975

[30] Foreign Application Priority Data

Jan. 17, 1975 Switzerland .......................... 588/75

[51] Int. Cl.$^2$ .......................................... H02H 7/08
[52] U.S. Cl. ...................................... 361/27; 361/106; 310/68 C
[58] Field of Search ............... 317/13 C, 13 B, 13 R, 317/41; 318/471, 472, 473, 221 C, ; 310/68 C, 68 R, 68 B, 68 D

[56] References Cited

U.S. PATENT DOCUMENTS

| 1,752,609 | 4/1930 | Poynder | 310/68 C X |
| 2,575,922 | 11/1951 | Langenwalter | 310/68 C |
| 3,317,874 | 5/1967 | Honsinger | 310/68 R X |
| 3,329,869 | 7/1967 | Obenhause | 317/13 C |
| 3,358,208 | 12/1967 | Takami | 318/473 |
| 3,404,313 | 10/1968 | Happel et al. | 317/13 C X |

Primary Examiner—J D Miller
Assistant Examiner—Patrick R. Salce
Attorney, Agent, or Firm—Flynn & Frishauf

[57] ABSTRACT

A rotary transformer having a stator and a rotor is energized by a power supply at commercial power frequency; sensors are located on the rotary part of the machine and provide sensing output signals, at discrete threshold levels, to a threshold circuit which, in accordance with the sensed signals, provides loading on the transformer secondary in discrete steps; the loading on the secondary is reflected into the primary and sensed to provide, selectively, alarm or stop-motion signals if operating parameters, typically temperature, as sensed by the sensors, reach levels necessitating an alarm or even a stop-motion signal.

35 Claims, 11 Drawing Figures

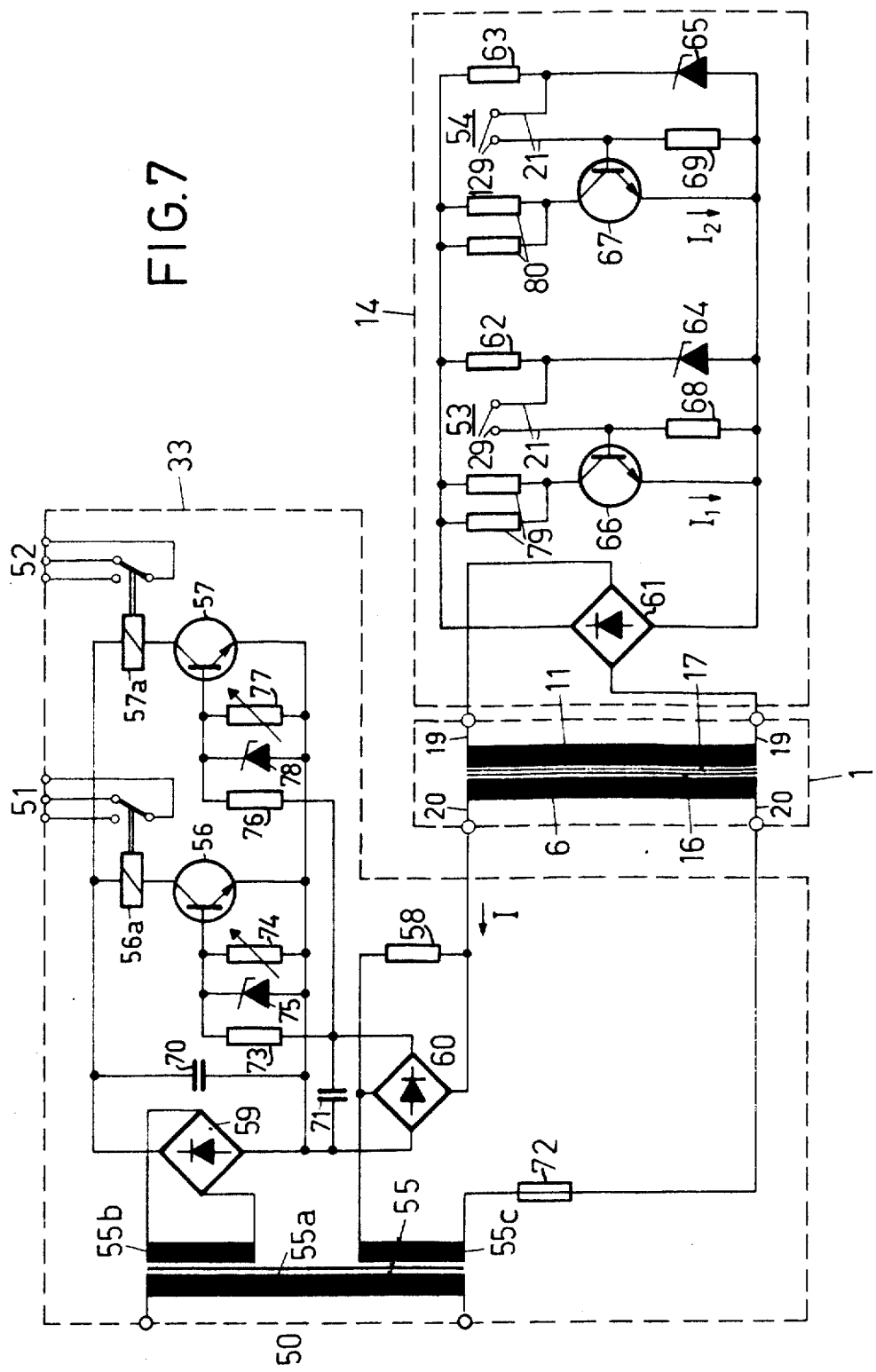

SUPERVISORY AND CONTROL SYSTEM FOR ROTARY MACHINERY, PARTICULARLY ROTARY ELECTRICAL MACHINES

The present invention relates to a measuring and supervisory system for rotating machinery, and more particularly to such a system, and components used therein, to transmit information regarding temperatures or other operating conditions to a stationary supervisory or control box in which the sensed parameters can be evaluated to initiate control functions, for example providing an alarm, stopping operation of the machine, or the like.

It has previously been proposed to supervise the operation of rotating machinery with respect to temperatures arising therein by transmitting temperature information sensed in a rotating part of the machine by means of transducers to a stationary part of the machine. Transmission by means of high-frequency signals has been proposed using antennae, coupling coils or coupling capacitors connected, for example, in a damped oscillator circuit. These systems operate at specially assigned frequencies and require separate arrangements to suppress noise and other effects which interfere with proper transmission of information.

Another system of transmission of information utilizes transmission of pulses by rotary magnets. The operation of this system depends on the position as well as on the speed of the rotating machine element to be supervised.

It is an object of the present invention to provide a system to supervise rotating elements of machinery, and particulary electrical machinery which is simple, inexpensive, essentially immune to noise and interference, and independent of speed; and which, further, can readily be attached or applied to a machine to be supervised. The system should permit transmission of information by electrical signals having characteristic voltage or current values representative of temperature, strain, insulation resistance, and the like, to classify the information and to then evaluate the information to protect the machine being supervised.

It is particularly important to protect asynchronous motors being started under load and variable speed d-c motors with respect to thermal overload. There is a definite need for arrangements which particularly protect the rotor windings of such machines having the features forming the objects of the present invention. The present invention is, therefore, particularly applicable to the thermal protection of such machines and will be described in connection therewith.

SUBJECT MATTER OF THE PRESENT INVENTION

Briefly, sensors are located on the rotating parts or elements of the machine to be supervised. The sensors provide output signals representative of operating conditions occurring in the rotor, for example temperature at selected locations and may, in one embodiment, comprise thermally responsive elements such as cold-conducting, positive thermistors. The rotating element of the machine is coupled to the rotor of a rotary transducer which is connected to threshold circuits located on the rotor and rotating therewith and two which the sensors are connected. The threshold circuits provide threshold signals at predetermined sensed conditions to the rotor winding of the rotating element of the transducer. A control network connected to a stator winding of the stationary part of the transducer and inductively coupled to the rotor windings includes circuitry to evaluate the threshold signals and to transform them into warning and trigger signals to effect control functions. The stator winding and the rotor winding combination of the transducer simultaneously functions as the supply source for electrical power for the entire measuring system.

It is a particular advantage of the system that it can operate at power network line frequency (e.g. 50 Hz or 60 Hz). No special signals at special frequency need be generated and, particularly, it is not necessary to provide a source for currents at high frequency. The power transmission is effected at high frequency and therefore components located on the rotating portion of the system can use active elements such as switches or transistors. Information data can readily be transmitted in the form of predetermined steps in current values operating at high power levels, so that the influence of extraneous noise and interference is practically eliminated and the system is virtually unaffected by stray disturbances. Rotating machinery, besides the rotational displacement between the rotating and stationary parts, frequently also is subject to axial displacement. This axial displacement will also affect transmission of information data over the transducer which is similarly subject to axial displacement. The system in accordance with the present invention is practically immune to those axial displacements which arise in the operation of ordinary electrical rotating machinery. Eddy currents which arise practically are without effect since the induction which is used in the system is only a few hundred Gauss, so that magnetic tensions are small. The coaxial arrangement of the transducer with respect to the rotary shaft does not cause unbalance of the machine. The operation of the rotary transducer is independent of the instantaneous position and of the speed of the rotor. The properties of transmission of the system are not impaired even if the rotor is stopped, assuming the system to function properly.

Transmitting information at a high power level has the further advantage that the use of active elements in the rotor permits later transmission by defining the information content as specifically defined steps in current (or voltage or power) levels, and to evaluate various levels or steps of current (or voltage or power) to transmit different information data items. A greater tolerance of the individual sensors located in the rotor of the machine to be supervised can be accepted and the supply voltage for the system may also vary within a greater range of tolerance.

The invention will be described in connection with various examples illustrating supervision of the temperature arising in windings of electrical rotary machinery by use of temperature-dependent resistors. The invention will be described by way of example with reference to the accompanying drawings, wherein:

FIG. 7 is a detailed diagram of a transducer system together with a threshold circuit and a control network;

Figure 1:
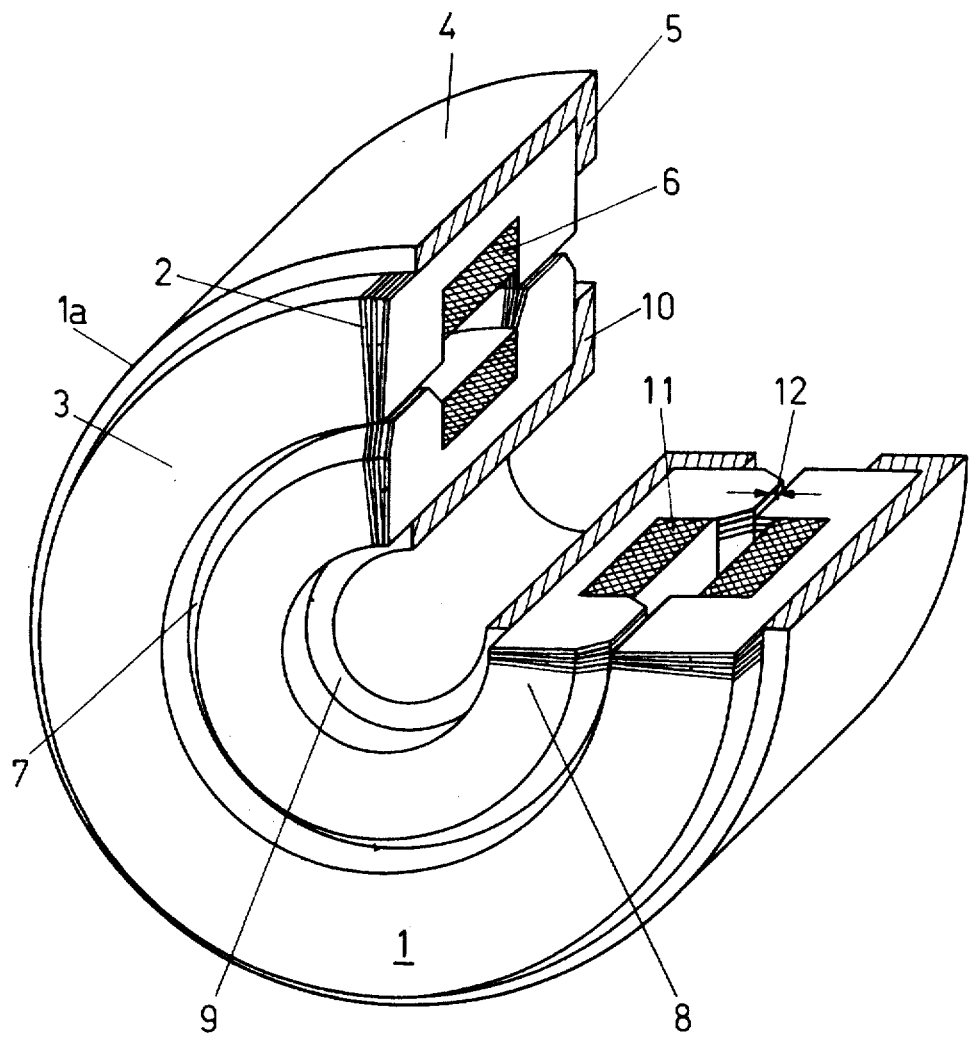
FIG. 1 is a perspective part sectional view of the transducer illustrating its stationary and rotary elements.

The stationary element 1a of the transducer 1 (FIG. 1) is connected to a control network in a control unit 33 (FIG. 7). The control unit includes the alarm and stop-motion outputs. It is separate from the transducer 1.

The stator 1a has, as the magnetically active iron circuit, U-shaped laminations 2. These laminations are bonded together by a synthetic resin to form a ring-shaped stator lamination assembly 3. The stator lamination assembly 3 has a cylindrical outer surface which is bonded, also with synthetic resin, to an essentially ring-shaped housing sleeve 4 which surrounds the lamination stack 3. The housing sleeve 4 merges at an end surface with a circular flange 5 which provides lateral support for the stator lamination stack 3. The stator winding 6 is located in the gap or open portion between the legs of the U formed by the stator lamination stack, facing the rotary portion of the transducer which is located concentrically with the stator.

A threshold circuit 14 (FIG. 7) is located on or connected to the rotor 7 (FIG. 1) of the transducer. The threshold circuit 14 is connected to sensors or measuring signal transmitters, such as thermistors. The terminals for connecting the sensors, for example the thermistors, and/or for the threshold circuit, respectively, and secured to an end face of the rotor 7, for connection to a winding 11 (FIG. 1) in the rotor 7, have been omitted from the drawing of FIG. 1. The rotor 7 is concentric with and covered by the stator 1. It is constructed similarly to the stator and has U-shaped laminations which are adhered together by resin to form a ring-shaped rotor lamination stack 8. The stack 8 is open with its U-shaped profile towards the stator stack 3. Together, the iron or magnetic portions of stator and rotor form a loop, such as an O, broken by air gaps 12 between stator 1a and rotor 7. A housing sleeve 9 extends along the inner surface of the rotor stack 8, and is secured thereto by resin. The housing sleeve is formed with a ring-shaped flange 10 at one end thereof, at least, to provide lateral support to the rotor stack 8. The rotor winding 11 is located in the gap between the legs of the U-shaped laminations. If desired, the stator stack 3 can be welded to its housing sleeve 4; similarly, the rotor stack 8 can be welded to its housing sleeve 9, thus providing stronger connections. The stator winding 6 and the rotor winding 8 are concentric with respect to each other and are connected to the respective stator stack 3 and rotor stack 8 by means of adhesives. The stator 1a of the transducer 1 is secured to the end shields of the machine to be protected and supervised; the rotor 7 is secured to the free end of the shaft of the machine. Variations in speed, as well as axial and radial shifts of the rotor 7 with respect to the stator 1a which may arise in the operation of electrical machinery practically have no influence on the operation of the transmission of information of the rotary transformer 1.

Figure 2:
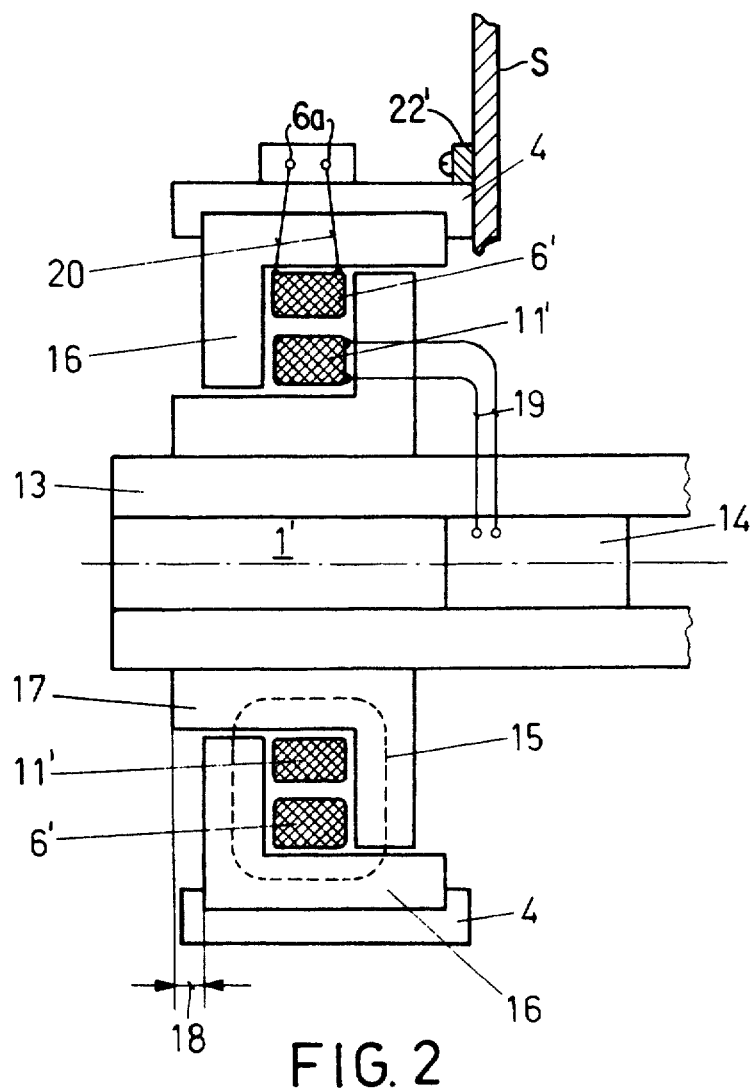
FIG. 2 is a highly schematic axial longitudinal section through a transducer having L-shaped stator and rotor laminations, and in which a threshold detector is located within the rotor shaft.

FIG. 2 illustrates another embodiment of a transducer, in a highly schematic axial longitudinal view. Components identical to those in FIG. 1 have been given the same reference numerals, and generally similar, and similarly functioning elements the same reference numerals with prime rotation. Transducer 1' has a shaft 13 which is hollow, at least in part. The threshold circuit 14 is located within the cavity formed by the hollow shaft 13. The magnetic flux shown by broken line 15 links the iron laminations of stator and rotor. Contrary to the embodiment of FIG. 1, the stator and rotor laminations are L-shaped. This greatly simplifies the insertion of the stator winding 6', as well as of the rotor winding 11' into the respective iron core. In this embodiment, as well as in others, the iron of the magnetic circuit need not be in the form of laminations; rather, the magnetically active substance may be a compound of core material, such as compressed metal powder with a binder, such as a resin binder, or of sintered material. The maximum axial displacement of the rotor with respect to the stator for the embodiment of FIG. 2 is shown by the dimension 18. The rotor winding 11' is connected by means of wires 19 to the threshold circuit 14; wires 20 connect the stator winding 6' to terminals 6a on the housing sleeve 4 thereof for further connection to the control unit 33 (FIG. 7), not shown in FIG. 2.

Figure 3:
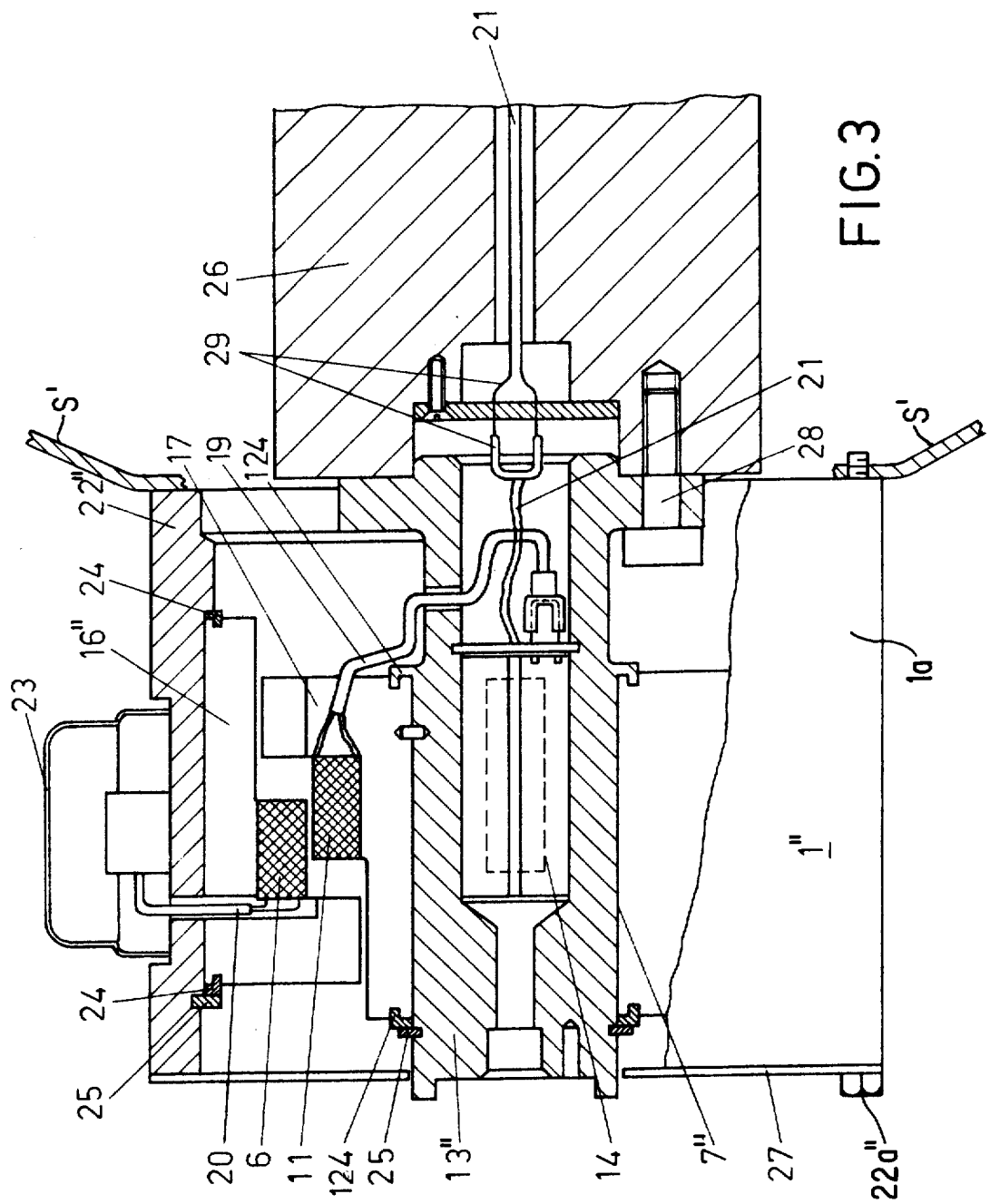
FIG. 3 is a schematic cross-sectional view, to a different scale, of another embodiment of a transducer illustrating also connecting wires, and a portion of the shaft of the machine to be supervised.

FIG. 3 illustrates another embodiment in which double prime notation is used for elements similar to those of FIGS. 1 and 2. The stator housing 22 of the transducer 1" carries a housing cover 23 in which the terminals for connection to the control unit 33 are located. The L-shaped laminations 16" of the stator are secured to the housing 22 by clamping rings 24; the laminations 17" of the rotor are secured by means of clamp rings 124 to the shaft 13". Axially positioned holding rings 25, such as C-rings, are secured in a groove in the shaft 13" and housing 22 to retain clamping rings 24 in position. The machine to be supervised has an output shaft 26 to which the rotor 7" of the transducer is connected by means of bolts 28, threaded into tapped holes in the end of shaft 26. A cover 27 closes off the free end of the transducer at the side opposite the shaft 26. The shaft 26 of the machine is formed with a concentric, enlarged opening into which an end projection of the shaft 13" of the transducer 1" can fit to provide exact centering of the rotor 7" of the transducer with respect to the shaft 26 of the machine. To permit ready assembly and disassembly of the transducer 1" from the machine, plug-in connectors are provided for the connecting lines 21 leading from the sensors to the threshold circuit 14.

Figure 4:
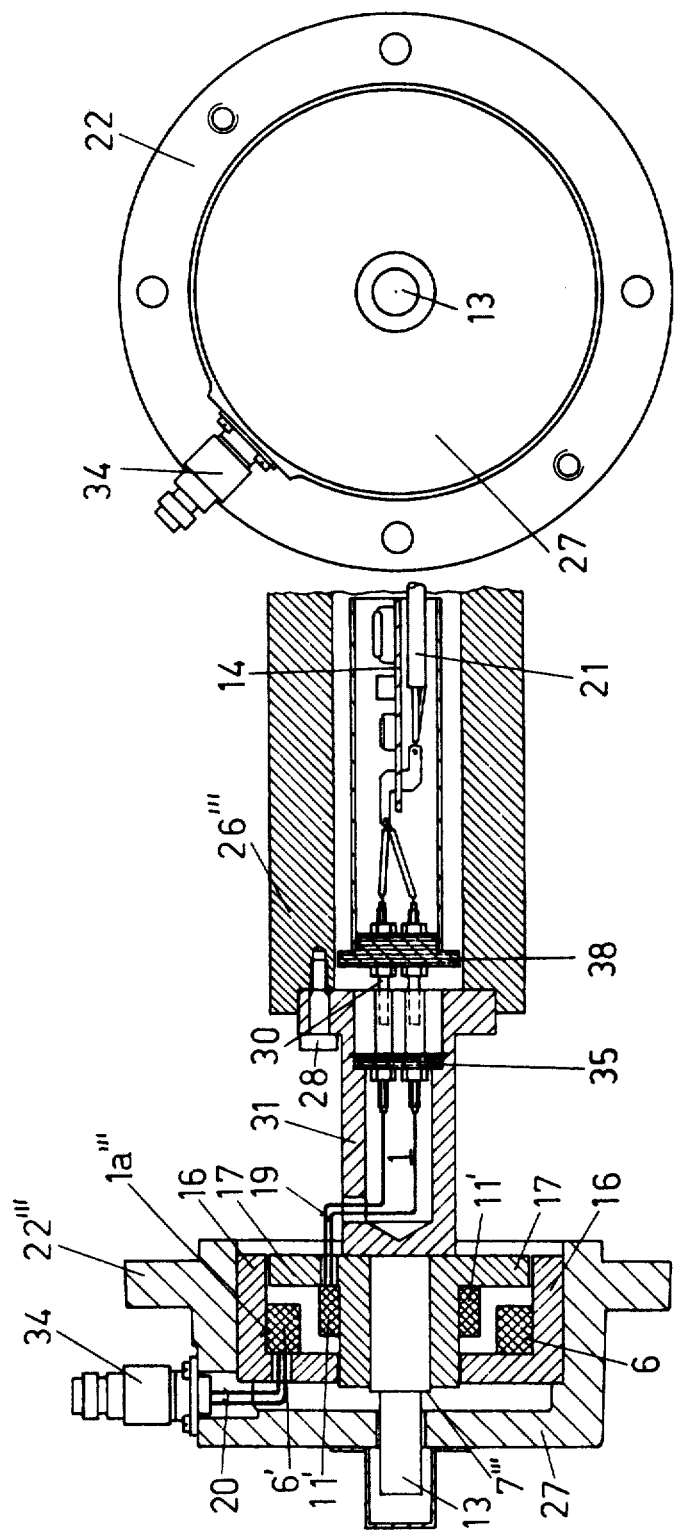
FIG. 4a is a longitudinal axial cross-sectional view, to another scale, of a transducer system and showing a plug connection to connect the control system and having a threshold circuit located axially on a shaft flange of the rotary transducer element.
FIG. 4b is an end view of the housing of the transducer.

FIGS. 4a and 4b illustrate yet another embodiment of the transducer. The threshold circuit 14 is contained within the shaft 26''' of the machine, rotating with the rotor 7. It is connected to a shaft flange 31 of the transducer facing the shaft end 26''' of the machine to be supervised, by means of a plug 30. A further plug connector 34 connects the control unit 33 to the stator 1a'''. The shaft flange 31 of the rotor 7''' is again secured to the shaft 26''' of the machine to be supervised by means of bolts 28. The front view of the transducer of FIG. 4a is seen in FIG. 4b, which also shows the connector 34, as well as housing 22''', formed with an apertured flange for connection to the end shield or end bell of the machine, for example by means of spacer bolts.

Figure 5:
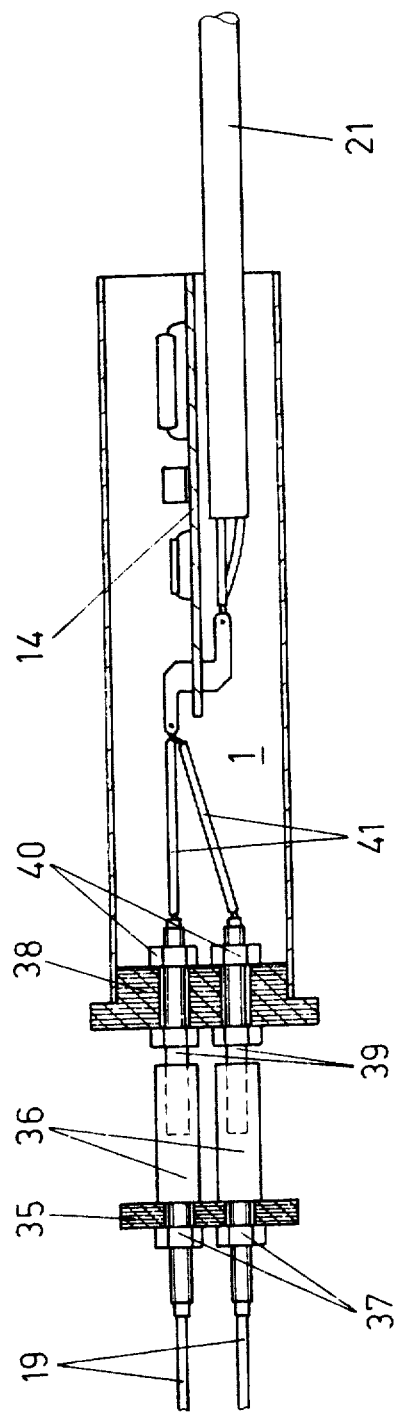
FIG. 5 is a longitudinal fragmentary schematic sectional view showing the threshold unit rotating with the rotor element of the transducer, as well as with the shaft of the machine to be supervised.

The threshold circuit 14 which rotates together with the rotor generally denoted at 7 is shown in detail in FIG. 5. Plug connection 30 (see FIG. 4a) includes a socket holder 35 with multi-terminal sockets 36 secured to the holder 35, formed as an insulating plate, by means of nuts 37. The socket pins 39 are secured to an insulating pin holder plate 38 by means of nuts 40. Connecting wires 41 connect the pins 39 to the threshold circuit 14. Circuit 14 is an electronic circuit to which, in turn, the wires 21 connected to the sensors are secured and electrically connected. The holder plate 38 can be secured to the interior of the shaft 26''' (FIG. 4a) for example by an adhesive or otherwise suitably attached. Likewise, holder plate 35 is connected to flange 31 by an adhesive, such as an epoxy resin.

Figure 6:
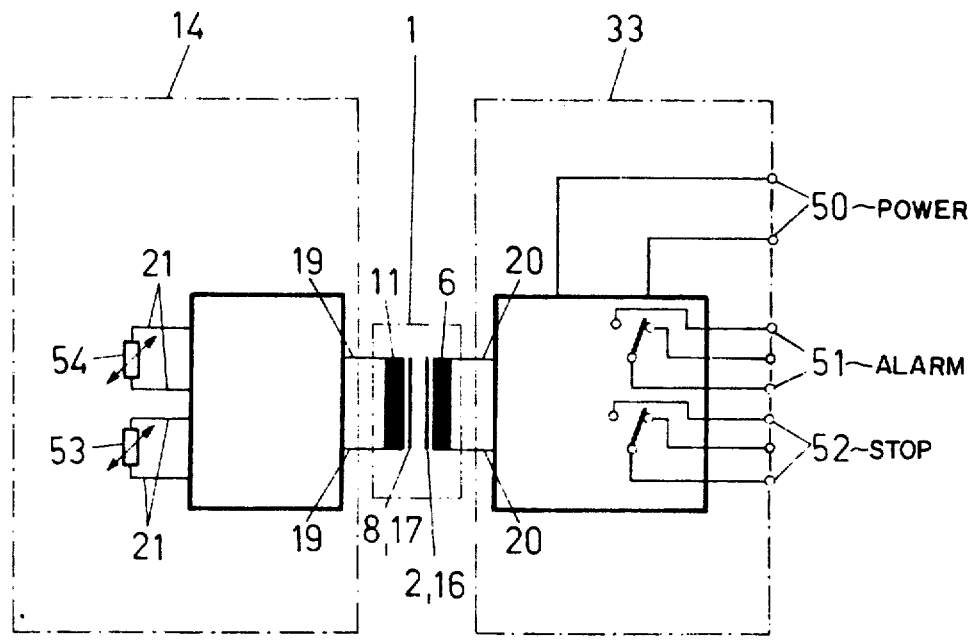
FIG. 6 is a schematic block circuit diagram of the measuring system for a machine having at least one rotating portion.

FIG. 6 schematically illustrates connection of the transducer for a machine with at least one rotating part, in which the iron magnetic circuits 2, 16; 8, 17; the windings 6, 11; and the respective connecting lines 19, 20 are only schematically indicated. The control unit 33 is supplied with power from power mains 50 having one terminal connected to neutral or chassis, for example, and the other to a phase terminal of the machine to be supervised, if a multi-phase machine. The power supply, for example, has a frequency of 50 or 60 Hz. Output terminals 51 provide warning indications and output terminal 52 connects to a stop-motion or machine tripping device. Two groups of sensors, formed as temperature-sensitive resistors such as thermistors 53, 54, are connected by lines 21 to the threshold circuit proper which, in turn, is connected by means of lines 19 to the transducer. One of the groups of temperature sensors is so calibrated that, in combination with the threshold circuit, it provides an alarm when a certain first threshold level is reached; the other sensor is so calibrated that, if the alarm was ignored and the temperature continues to rise, the stop-trip of the machine is actuated over line 52. The groups of sensors 53, 54 each may actually be six, or any other plurality of series-connected thermistors. It is, of course, also possible to use more groups of cold-conductor sensors, such as positive thermistors, for detection of additional temperature levels; or to use other sensors to detect other conditions arising in the machine, for example deformation, if sensed by strain gauges, excessive fields sensed by capacitor elements, or the like.

The detailed circuit of the system of FIG. 6 is shown in FIG. 7. The groups of thermistors 53, 54 have been omitted; they are connected to terminals 29, 129, respectively, of the threshold circuit. The thermistors of group 53 are calibrated for a temperature level which is to trigger a warning or alarm signal; the thermistors of group 54 are calibrated for temperature levels which are to initiate shut-down of the machine. Multiplying the number of sensors being connected to the transducer does not require any change in the transducer device itself, and information from a larger number of sensors and from a threshold circuit having a greater number of threshold levels can be transmitted by the same transducer.

The terminals 29, 129, preferably formed as plug-in terminals, are connected to series-connected positive thermistors, for example six connected in series. Power transformer 55 in control unit 33 is connected to power supply terminals 50. The power transformer 55 has a primary winding 55a and two secondary windings 55b, 55c. The first primary winding 55b of power transformer 55 is connected to a first rectifier 59 which supplies rectified power to a first amplifier transistor 56 as well as to a second amplifier transistor 57. The amplifier transistors 56, 57 are connected to provide power to respective relay windings 56a, 57a of the alarm and stop outputs 51, 52, respectively, of control unit 33. One terminal of the stator winding 6 of the transducer is connected through a resistor 58 to the second secondary winding 55c of transformer 55. The other terminal of stator winding 6 connects through a fuse 72 likewise to the second secondary winding 55c. A second rectifier 60 is connected in parallel to the resistor 58.

The threshold circuit 14 includes a third rectifier 61 which is connected across the rotor windings 11 of the transducer. The rectified voltage of the rotor windings is connected across two voltage dividers; one of the voltage dividers is formed by resistors 62 and Zener diode 64; the other is formed by resistor 63 and Zener diode 65. The junction points of the respective voltage dividers are connected to one of the respective terminals 29, 129 to which the positive thermistor groups 53, 54 are connected; the other terminals 29, 129 of the respective positive thermistor groups 53, 54 are connected to the bases of respective transistors 66, 67 and through base resistors 68, 69 to the emitters of the respective transistors and back to the rectifier 61. The series connection of the respective positive thermistor 53, 54 and the base resistors 68, 69 forms a further voltage divider. The collectors of the transistors 66, 67 are connected through respective resistors 79, 80 to the other terminal of the d-c supply from the rectifier 61. Two resistor elements are shown for the resistors 79, 80, one forming the main resistor and the other forming a calibrating resistor for example of substantially higher value than the main resistor to match response of the circuit to the respective thermistors and to characteristics of the transistors being used.

The control unit 33 has a smoothing capacitor 70 associated with the first rectifier 59; a further smoothing capacitor 71 is associated with the second rectifier 60. The amplifying transistor 56 has a base resistor 73, a base-emitter resistor 74 and a Zener diode 75 connected in parallel thereto. Similarly, transistor 57 has a base resistor 76 and a parallel connection of resistor 77 and Zener diode 78 connected in the base-emitter circuit thereof.

Operation: If the temperature of the elements, for example the windings of rotating electrical machinery, is below a first threshold or response level, that is, for example is in its proper operating range, then the thermistors of the thermistor groups 53, 54 will have a low temperature value. If the resistance across terminals 29, 129, respectively, is low, transistors 66, 67 will be conductive and currents $I_1$ and $I_2$ will flow in the emitter-collector main current path of the transistors as determined by the voltage across the secondary winding 11 of the transducer and as determined by the resistance values of the resistors 79, 80. The currents $I_1$ and $I_2$, together, correspond to a combined current I in the primary winding 6 of the transducer. This current causes a voltage drop across resistor 58 which is rectified in the second rectifier 60 and so controls the two amplifying transistors 56, 57 that transistors 56, 57 are conductive, thus causing their emitter-collector path to draw current through the respective relay coils 56a, 57a. The relays will pull in. The connection of terminals 51, 52 is so made that, with the relay energized, no alarm or stop-motion signal is provided; the system is, therefore, fail-safe. If the relay is a three-terminal or switch-over terminal relay, an indication of "proper operation" can be given.

If the temperature rises, so that the threshold level of any one of the thermistors in the first thermistor group 53 is exceeded, the resistance value of the series-connected thermistors will rise rapidly, causing the transistor 66 to block. Current $I_1$ will thus drop to approximately zero and, as a result, the level of the current I in the stator winding 6 of the transducer will be reduced. As a result, the output from rectifier 60 will decrease. The resistor 74 of transistor amplifier 56 is so set that, upon such decrease in output, transistor 56 will block, causing relay 56a to drop out so that the previously open terminal will close and, if a three-terminal connection as shown, the relay will switch in the connection indicated, providing a warning signal. The amplifying transistor 56 is so set that it has a higher response threshold value than that of the amplifying transistor 57. If the temperature continues to rise, so that at least one of the thermistors of the thermistor group 54 responds, the second transistor 67 in the threshold circuit 14 is similarly caused to block, so that its emitter-collector current will likewise drop to almost zero value. This further substantially and markedly decreases the voltage drop across resistor 58 — to a further noticeable extent beyond the decrease of current I when the current $I_1$ from transistor 66 failed. This further decrease causes additional response of amplifying transistor 57, similarly to the response of transistor 56, by suitable setting of the resistor 77. Thus, the lower-set threshold level of response of transistor 57 is passed, causing switch-over over of relay 57a to the position shown and initiating further operations for the protection of the machine being supervised, for example to trip a stop-motion relay.

Figure 8A:
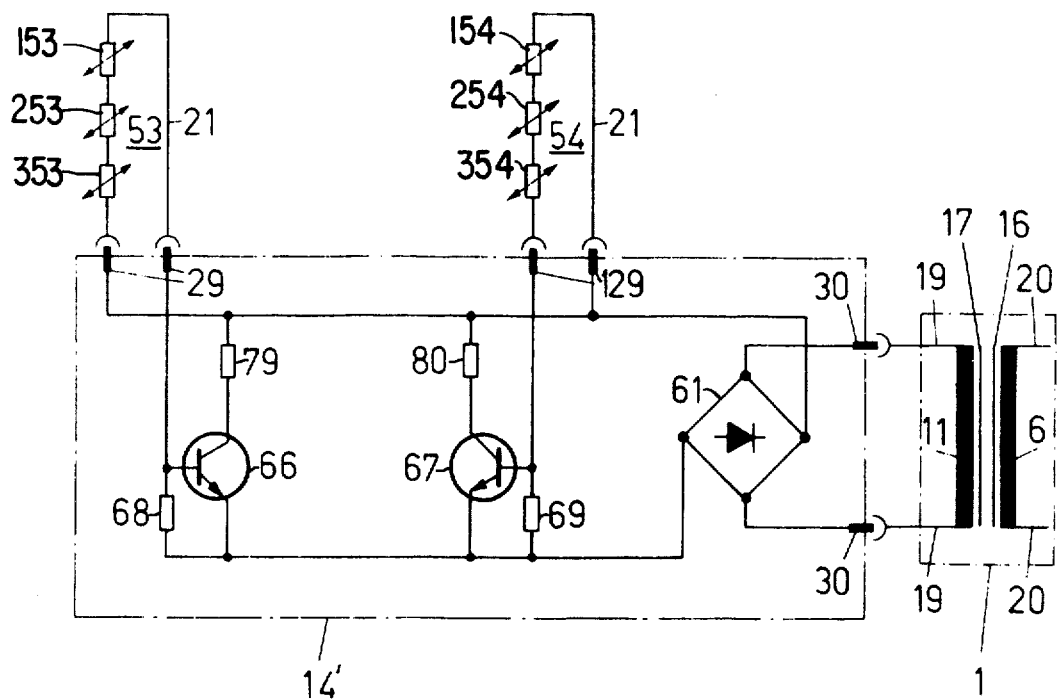
FIG. 8a is a schematic diagram of another embodiment of a threshold circuit, which is simplified with respect to that shown in FIG. 7, and which also illustrates series-connected thermally responsive resistors having cold-conduction characteristics.

FIG. 8a is a schematic diagram of a simplified type of threshold switch 14', in which elements previously described have been given the same reference numerals, and if only similar, with a prime notation. The threshold circuit 14' is connected to the transducer rotor winding 11 by means of plug-and-pin connectors 30 (see FIG. 4a) to permit ready replacement, repair, or wiring changes in either of the transducer or of the threshold circuit 14'. For simplicity, three series-connected positive thermistors 153, 253, 353, having cold-conduction characteristics, are provided for a warning threshold level; similarly, three thermistors 154, 254, 354, together forming thermistor group 54, are provided to trigger a response at higher temperature levels. The individual thermistors of each group are series-connected and can be located at suitable positions within the rotor of the machine; thermistors 153, 154 of the two groups may be located adjacent each other, for example. The threshold value of the thermistors of group 53 may, for example, be at 110° C; the threshold of the thermistors 54 will have a higher value, for example 130° C. The thermistor elements 153 . . . and 154 . . . have low resistance at temperatures below their respective threshold levels.

Operation: Base current flows through the transistors 66, 67 when all the thermistor elements 153 . . . , 154 . . . are at a temperature below their threshold level. The base current in the transistors 66, 67 holds the transistors in conductive state, so that the collector-emitter current is again determined by the value of the voltage applied across the transistors and by the respective values of the resistors 79, 80. If the rotor temperature of the machine to be supervised (not shown in FIG. 8a) exceeds 110° C at any point in the machine where a thermistor element is located, the respective thermistor elements, or at least one of them, will assume high resistance value. This causes transistor 66 to block. The current taken by the transistors 66, 67, as supplied by the transducer, will therefore drop to about half the value of the current taken when the rotor is not excessively heated. If the rotor temperature further rises, and reaches the second threshold value of 130° C, the resistance of one or more of the thermistor elements 154, 254 . . . of the group of thermistors 54 will rise, causing transistor 67 to block. This will reflect a high impedance through winding 11 of the transducer, that is, the current being drawn by the threshold circuit will drop to an extremely low value, much less than the current if only transistor 66 was blocked. The control unit 33 now need not supply substantial power to the transducer, and hence to the threshold circuit but need supply practically only the magnetizing current necessary to supply losses in the transducer 1. The rectifier 61, preferably a bridge circuit, rectifies the power supplied by the control unit 33 to the transducer, for further supply of rectified power to the transistors 66, 67.

Figure 8B:
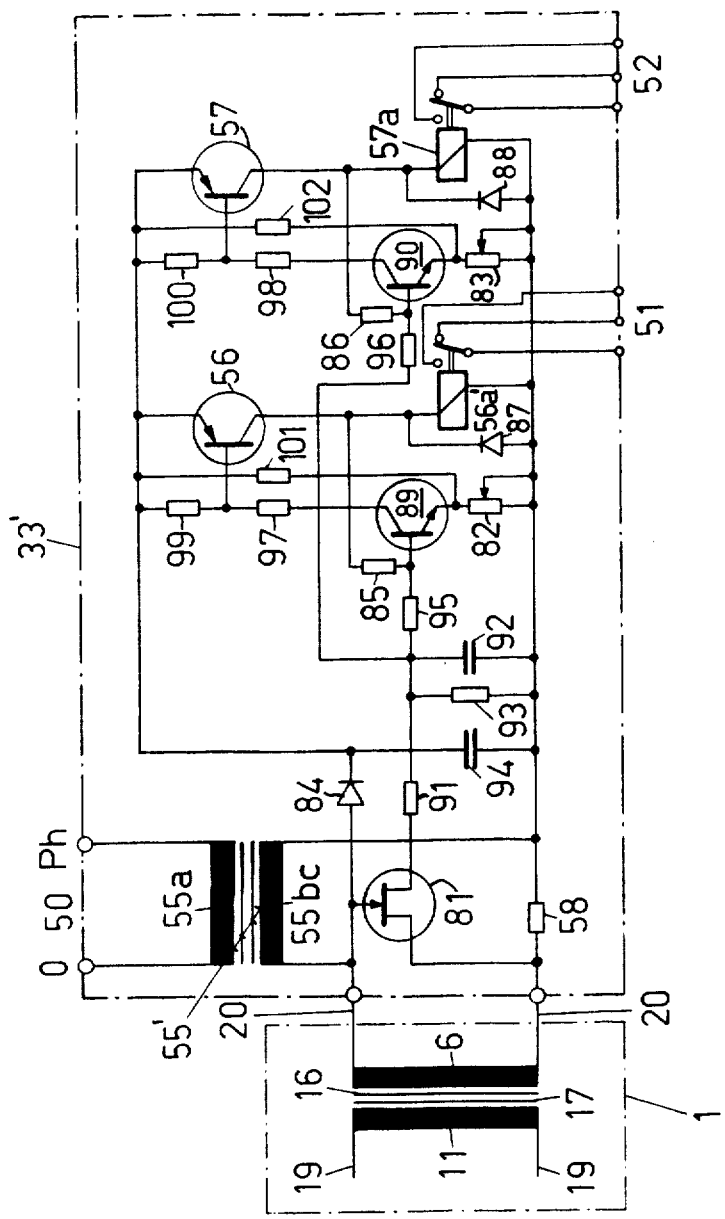
FIG. 8b is a circuit diagram illustrating another embodiment of a control system in which current is measured by means of field effect transistors (FET's) controlled by and synchronized with the power supply mains.

Another embodiment of a control circuit 33' is illustrated in FIG. 8b, in which terminals 50 again are connected to zero or neutral connection and to a phase connection of a power supply mains, respectively. The control unit 33' provides power to the transducer 1 (and likewise to the transducers of FIGS. 2-4) and hence to the threshold circuit 14 (as well as 14'), and evaluates the current so supplied, in dependence on temperature of the machine to be supervised. The current taken by the threshold circuit has three (or more) discrete steps: in normal operation, the current has a high or maximum design value; to initiate a warning operation, the current has an intermediate value, approximately half or slightly more than half of the maximum; and to initiate an emergency stop or shut-down operation or other warning signal, the current has an extremely low value or, in case of malfunction of the apparatus, can be zero.

The current taken up by the transducer 1 is measured by means of resistor 58 as well as by a field effect transistor (FET) switch 81 which is so connected that only the ohmic load current is sensed, and the magnetizing current of the transducer 1 is eliminated. The response levels of the amplifying transistors 56, 57 to initiate warning or stop-motion, respectively, are set by potentiometers 82, 83. To provide for fail-safe operation, the relay terminals controlled by relay coils 56a, 57a are connected in "normally closed" mode, so that failure of supply voltage will provide both a warning signal as well as initiate shut-down or further control function. The supply voltage from the power mains at terminal 50 is connected to transformer 55'. Transformer 55' provides power both for the transducer 1 as well as for the electronic components of the control unit 33'. The power for the control unit 33' is rectified by rectifier 84.

Coupling resistors 85, 86 provide positive feedback from the collector of the respective transistor 56, 57 to the base of preamplifier transistors 89, 90, respectively, associated with the respective transistors 56, 57. The positive feedback effects hysteresis of the switching levels of the respective stages of the control unit 33 regarding the generation of the warning, or the trip signal, respectively. The unit thus becomes insensitive with respect to superposed hum voltage. The freewheeling diodes 87, 88 connected in parallel to the relay windings 56a, 57a, respectively, protect the amplifying transistors 56, 57 against voltage peaks upon interruption of current through the relay windings 56a, 57a, respectively. The series resistor 91, connected in series with FET 81, provides rectification to an approximate average or mean value. Resistor 91 is connected to a parallel R/C network formed of resistor 93 and capacitor 92, resistor 93 forming a discharge resistor for the capacitor 92. A capacitor 94 is connected to the output of rectifier 84 to provide for smoothed power supply voltage. The transistors 56, 57 have their base voltages determined by the position of the tap point of respective voltage dividers formed of resistors 97, 99 and 98, 100, respectively, connected in series with the collector-emitter paths of the respective transistors 89, 90. Potentiometer 82 and resistor 101 form a voltage divider associated with the warning stage; potentiometer 83 and resistor 102 form, together, a voltage divider for the trip or final control stage to determine the operating point of the emitter of transistor 90.

Various other circuits are possible for use in the control unit 33. Thus, rather than using transistors 89, 90 associated with the respective power transistors 56, 57, operational amplifiers can be used to control conduction of the respective transistor upon sensing of input signals derived from the transducer in multiple levels or ranges.

Figure 8C:
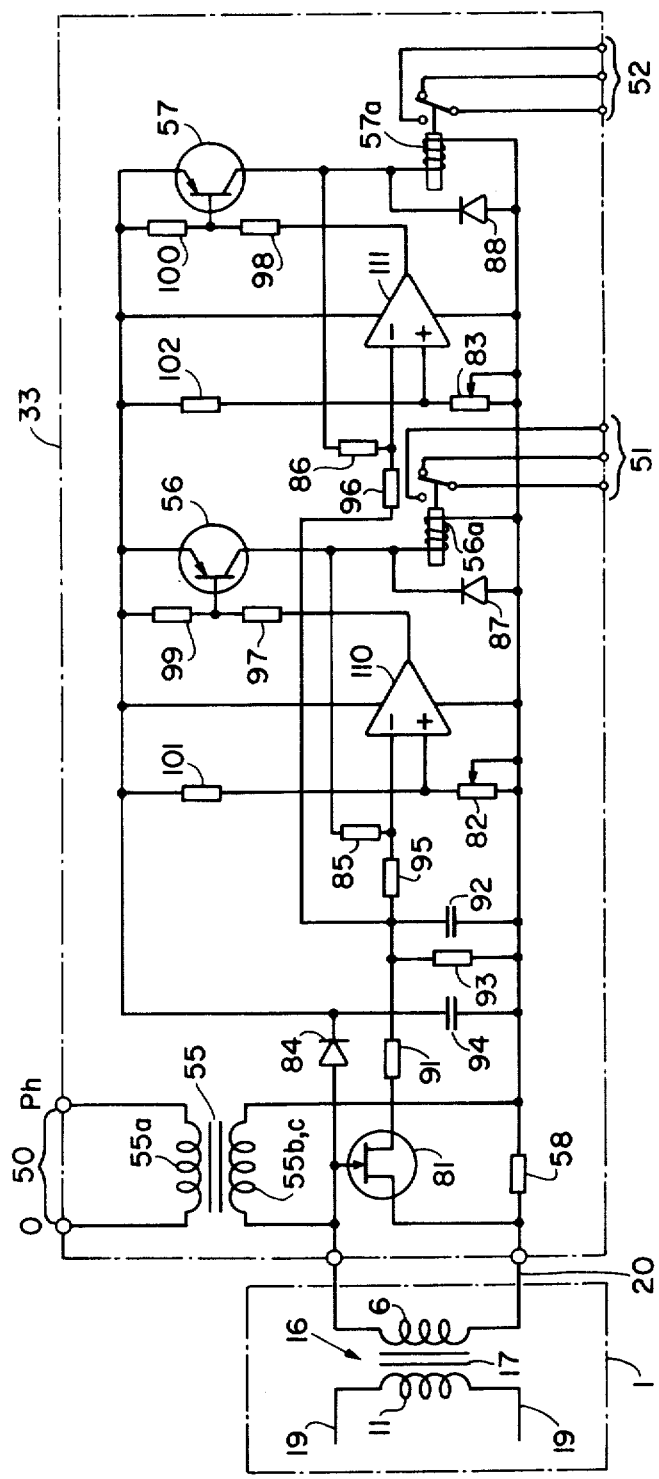
FIG. 8c is a fragmentary diagram of another embodiment of the circuit of FIG. 8b.

FIG. 8c is a fragmentary embodiment showing control of transistor 56 by means of an operational amplifier 110, the direct input of which has a voltage applied thereto as determined by the voltage division ratio of the resistors of voltage divider 111; the inverting input has a signal applied thereto from transducer 1. Power supply from the power mains, biassing and load resistors, and smoothing capacitors have been omitted.

The circuit of FIG. 8c, as well as the circuit of FIG. 8b, by use of the FET 81, are synchronized with respect to the load current flowing through the secondaries 55b, 55c of the power transformed 55'. The magnetizing current, which is out-of-phase with respect to the load current will be insufficient to cause response of the FET 81, upon absence of load current, due to response of both the groups of thermistors 53, 54 – FIG. 8a – so that transistors 89, 90, under response conditions, will reliably control transistors 56, 57 to cut off, causing the relays 56a, 57a to drop out, and hence initiate an alarm function.

Various changes and modifications may be made, and features described and explained in connection with any one of the embodiments may be used with any of the others, within the scope of the inventive concept.

We claim:

1. Rotary machine supervisory system for components of a rotating part of the machine comprising at least one measuring sensor (53,54) providing measuring signals, located in or on the rotary machine part;

a rotary transducer (1) forming a transformer having a stator (1a), including a stator core and a stator winding located on a stationary part of the machine, and a rotor (7) including a rotor core and a rotor winding located on the rotary machine part;

the core of the stator being ring-shaped and having, in axial section, an L-shaped cross section and the core of the rotor (7) being ring-shaped and having, in axial section, an L-shaped cross section, said cores of the stator, and rotor, respectively, being positioned to form, together, a generally O-shaped, or rectangular axial section providing for coupling of said cores and hence of said windings.

a threshold circuit (14) rotating with the rotor (7) and electrically coupled to the sensor, or sensors (53, 54) and converting the measured signals into threshold-value signals having discrete steps or intervals between adjacent threshold levels, the threshold circuit having its output electrically coupled to the rotor (7) of the rotary transducer (1) in form of a load to load the rotor winding, selectively, in said discrete steps;

an electrical power supply (50) connected to the stator winding to transfer power to the rotor winding by transformer action;

and a control unit (33) connected to the power supply and electrically coupled to the stator (1a) of the rotary transducer (1), the control unit including response circuits providing discrete output signals corresponding to the discrete levels of the signals provided by the threshold circuit (14) and coupled through the transducer (1) to the control unit, said transducer further coupling electrical power from the stator to the rotor and hence to the threshold circuit (14) and the sensor, or sensors (53, 54).

2. System according to claim 1, wherein the discrete output signals comprise an "in order" signal an alarm signal (51) and a stop-motion or tripping signal (52).

3. System according to claim 1, wherein the power supply comprises means (50) supplying electrical power at power line frequency.

4. System according to claim 3, wherein the threshold circuit comprises power accepting means (66, 79; 67, 80) loading the rotor (7) of the transducer (1) at discrete levels in accordance with the sensed signals derived from the sensor, or sensors (53, 54);

and the response circuit comprises means (58) sensing the level of power transferred through the transformer formed by the stator (1a) and rotor (7) of the transducer.

5. System according to claim 1, wherein the cores are laminated cores and laminations of the stator lamination assembly (3) and of the rotor lamination assembly (8) are bonded by synthetic resin.

6. System according to claim 5, further comprising a support sleeve (4) surrounding the stator lamination assembly (3), the stator lamination assembly being bonded to the support sleeve;

and a rotor support sleeve (9) internally engaging the rotor lamination assembly (8), the rotor laminations being bonded to the rotor support sleeve;

said sleeves being formed with end flanges extending transversely with respect to the axis of rotation of the rotor, leaving at least one end face free.

7. System according to claim 5, comprising a stator support sleeve (4) surrounding the rotor lamination assembly (3) and being welded to the laminations thereof;

and a rotor support sleeve located internally of the rotor laminations, and welded thereto.

8. System according to claim 1, wherein the machine has an end shield (S), and the stator (1a) of the rotary transducer (1) is located on and secured to the end shield (S);

and the rotor (7) of the transducer (1) is located at the free end of the shaft (26) of the machine to be supervised.

9. System according to claim 1, comprising a shaft (13) forming part of the rotor (7) of the rotary transducer, said shaft being hollow at least in part;

the threshold circuit (14) being located within the cavity formed by the hollow of the shaft (13).

10. System according to claim 1, wherein at least one of the cores of the stator and rotor comprises granular or powdered metal and snythetic resin, or sintered material.

11. System according to claim 1, further comprising connecting lines (19) interconnecting the threshold circuit (14) and the rotor winding (11) of the rotor, and sensor connecting lines (21) including a plug connector (29) connecting the sensor, or sensors (53, 54) to the threshold circuit (14).

12. System according to claim 1, further comprising a housing (22) for the stator (1a) of the rotary transducer (1), and a plug connector (34) on the housing to connect the stator (1a) to the control unit (33).

13. System according to claim 1, wherein the threshold circuit (14) has at least three threshold levels, one level to indicate proper operation, a second level to initiate an alarm signal and a third level to initiate a stop-motion or tripping signal;

and a separate sensor (53, 54) connected to the threshold circuit, each responsive to changes in parameter exceeding a respective threshold level, the second and third threshold levels being higher than that of the preceding level.

14. System according to claim 13, wherein two sensors are provided, each comprising positive thermistors.

15. System according to claim 13, wherein two sensors are provided, the sensors are temperature-responsive sensors, one sensor (53) having a nominal response temperature of about 110° C, and the other sensor (54) having a response temperature of about 130° C, and the threshold circuit provides an alarm signal when the lower threshold value of 110° C is exceeded a stop-motion signal when the higher threshold value of 130° C is exceeded; and absence of a signal from either sensor is indicative of proper operation.

16. System according to claim 13, wherein (FIG. 7) the control unit comprises first and second transistors (66, 67), the sensors comprise, each, at least one positive thermistor (53, 54), a resistor (68, 69) connected in series with said thermistor to form a voltage divider therewith, the bases of the respective transistors being connected to the junction or tap point of the thus formed voltage dividers;

a second voltage divider comprising a series connection of a Zener diode of a resistor (64, 62; 65, 63) respectively, the respective thermistor (53, 54) having its other terminal connected to the respective tap point of the further voltage divider;

and respective load resistors (79, 80) connected in series with the emitter-collector paths of the respective transistors (66, 67).

17. System according to claim 1, wherein the control unit (33) comprises a transformer (55) connected to the power supply (50), the transformer having a secondary winding (55c) connected to the stator winding of the rotary transducer, the rotor of the rotary transducer providing power to the threshold circuit (14);

and a rectifier (61) connected between the threshold circuit (14) and the rotor (7) of the transducer (1).

18. System according to claim 17, wherein the transformer (55) has a first secondary winding (55b), a rectifier (59) connected to the first secondary winding to supply power to the control unit;

a second rectifier (60) connected between the second secondary winding (55c) and the stator (1a) of the rotary transducer, and a resistor (58) in parallel with the second rectifier (60) to sense the loading on the second secondary winding (55c) of the transformer as reflected by the loading on the rotary transducer.

19. System according to claim 1, wherein the control unit (33) comprises at least two amplifier stages, each having first and second threshold amplifiers (56, 57), the threshold level of one amplifier being higher than that of the other.

20. System according to claim 19, wherein the amplifier (56) having a lower threshold value than the other amplifier (57) provides an alarm output signal;

and the amplifier (57) having the highest threshold level provides a stop-motion or tripping signal.

21. System according to claim 20, wherein said amplifiers comprise, each, a transistor (56, 57), and relays (56a, 57a) connected in the emitter-collector path of the respective transistor.

22. System according to claim 19, wherein the control unit (33) comprises two threshold amplifiers having respective transistors (56, 57);

pre-amplifier transistors (89, 90), their emitter-collector paths connected to the bases of the respective transistors (56, 57), and a positive feedback connection (85, 86) from the emitter-collector circuit of the respective transistor (56, 57) to the base of the respective preamplifier transistor (89, 90).

23. System according to claim 19, wherein the control unit (33) comprises at least two amplifier stages, each including respective power transistors (56, 57);

and respective operational amplifiers (110) having their inputs connected to the transducer and controlling conduction of the respective power transistor (56, 57).

24. System according to claim 1, wherein the threshold circuit (14) and the control unit (33) include relays (56a, 57a), connected in fail-safe mode, to provide alarm and stop-motion output signals upon either: (a) sensing of conditions causing the respective signals, or (b) failure of power supply.

25. System according to claim 1, wherein the control unit (33) comprises means measuring current through the transducer (1), including a field effect transistor (81) and a series resistor (91), the field effect transistor (81) being energized by the power supply (50) and rendered conductive in phase synchronism therewith, to reject current flow through the transducer (1) which is essentially 90° - electrical out-of-phase with the main power supply.

26. Supervisory system for rotary electrical machines having a stator and a rotor comprising power supply means (50) providing a-c power to the system;

a transducer (1) forming a transformer having stator cores (2, 16) and a primary winding (6) connected to the power supply means located on the stator, and a rotor core (8, 17) and a secondary winding (11), located on the rotor, the primary winding (6) of the transformer being connected to the power supply means, the stator and rotor cores being magnetically coupled, separated by an air gap, so that power is transferred from the power supply means through the primary winding (6) on the stator to the secondary winding on the rotor;

sensing means (53, 54) located on the rotor of the machine in sensing relation thereto and providing output signals representative of operation parameters or conditions therein;

a threshold circuit (14) located on the rotor to rotate therewith connected between the sensing means and the rotor secondary and providing loading on the transformer secondary in discrete threshold levels or steps;

and a control unit (33) comprising a discrete loading level discriminator circuit, connected to the stator winding of the transformer and sensing the level, or step of loading placed on the transformer secondary as a measure of the sensed parameter.

27. System according to claim 26, wherein the threshold circuit (14) places three discrete load load steps on the transformer secondary; and the loading level discriminator circuit discriminates between said three levels; said levels representing: (a) normal operation, with all parameters or conditions being below a first level; (b) an alarm level in which a first threshold level is exceeded; and (c) an emergency or stop-motion level, causing a stop-motion signal to be generated by the discriminator circuit.

28. System according to claim 27, wherein the control unit 33 further comprises a resistor (58) connected in series with the primary winding (6) of the transformer to sense loading thereon.

29. System according to claim 26, wherein the threshold circuit connected to the secondary of the transformer comprises active elements.

30. System according to claim 29, wherein the active elements comprise transistors (66, 67), rendered selectively conductive when the sensing means sense conditions exceeding respectively different predetermined levels, the transistors including load resistors (79, 80) connected in the respective emitter-collector paths thereof.

31. System according to claim 26, wherein the stator core is ring-shaped and, in axial section, is L-shaped; and the rotor core is ring-shaped and, in axial section, is L-shaped, the stator and rotor being assembled together so that both cross sections fit together and form a generally O-shaped or rectangular section.

32. System according to claim 26, wherein the sensing means comprises positive thermistor elements (153, 253, 353; 154, 254, 354) serially connected, and arranged in at least two groups (53, 54), the elements in one group having a critical temperature which is less than the critical temperature of the elements of the other group (54).

33. System according to claim 26, wherein the power supply means provide a-c power at commercial power line frequency.

34. System according to claim 26, wherein the control unit includes means (58, 60, 71, 73, 56; 76, 57) sensing impedance of the variable load reflected to the primary winding (6) of the transformer.

35. System according to claim 26, wherein the control unit comprises means (58, 81, 91) synchronized with the power supply and activated in phase therewith to sense current flow in the transformer in phase with the power supply only.

* * * * *